(12) United States Patent
Katano

(10) Patent No.: US 8,400,445 B2
(45) Date of Patent: Mar. 19, 2013

(54) IMAGE PROCESSING PROGRAM AND IMAGE PROCESSING APPARATUS

(75) Inventor: Tetsu Katano, Tokyo (JP)

(73) Assignee: Sega Corporation, Tokyo (JP)

( * ) Notice: Subject to any disclaimer, the term of this patent is extended or adjusted under 35 U.S.C. 154(b) by 742 days.

(21) Appl. No.: 12/227,208

(22) PCT Filed: May 9, 2007

(86) PCT No.: PCT/JP2007/000497
§ 371 (c)(1),
(2), (4) Date: Aug. 6, 2009

(87) PCT Pub. No.: WO2007/129476
PCT Pub. Date: Nov. 15, 2007

(65) Prior Publication Data
US 2012/0098833 A1    Apr. 26, 2012

(30) Foreign Application Priority Data
May 9, 2006   (JP) ................................ 2006-130897

(51) Int. Cl.
*G06F 17/00* (2006.01)
*G06T 1/00* (2006.01)
*G09G 5/00* (2006.01)
(52) U.S. Cl. .................................... 345/418; 345/582
(58) Field of Classification Search ............. 345/418, 345/582
See application file for complete search history.

(56) References Cited

U.S. PATENT DOCUMENTS
7,423,653 B2 * 9/2008 Gettman et al. ............ 345/587
2005/0007385 A1 * 1/2005 Aoyama ...................... 345/632

FOREIGN PATENT DOCUMENTS
WO    WO-97/34213    9/1997

OTHER PUBLICATIONS

Diefenbach, P.J.; "Pipeline Rendering Interaction and Realism Through Hardware-Based Multi-Pass Rendering", PHD Thesis University of Pennsylvania, Jan. 1, 1996, pp. 1-152, I, XP001051169.
Diefenbach, P.J. et al; "Pipeline rendering: interactive refractions, reflections and shadows", Displays vol. 15, No. 3, Jul. 1994, pp. 173-180, XP002610958.
Blythe, David; "Lighting and Shading Techniques for Interactive Applications, Siggraph 199, Course 12", Aug. 8, 1999, pp. 116-129, XP002610959.
Mariko Shida et al., "Hantohmei Buttai eno Utsurikomi Dohteki Scene no Hyogen Hohhoh," Information Processing Society of Japan Kenkyu Hohkoku, Nov. 18, 2005, vol. 2005, No. 116, 2005-CG-121, Graphics to CAD, 2.2 Utsurikomi Gazoh no Sakusei, 2.3 Rendering Algorithm.

* cited by examiner

*Primary Examiner* — Jacinta M Crawford
(74) *Attorney, Agent, or Firm* — Jordan and Hamburg LLP

(57) ABSTRACT

Optical reflection and refraction are expressed of an object extending through a water surface by rather light load processing without using any cut models prepared in advance. A photographing angle of a virtual camera for displaying the object OB is set. Virtual cameras A, B and C are generated for photographing reflected and refracted object. The image processing is executed by projecting texture value of transparent degree for each of media different from texture for other media. Parameters are defined concerning the virtual cameras A, B and C, in order to achieve a desired visual expression of an object extending through various media.

6 Claims, 16 Drawing Sheets

IMAGE PROCESSING PROGRAM AND IMAGE PROCESSING APPARATUS

BACKGROUND OF THE INVENTION

The present invention relates to an image processing apparatus and an image processing program for expressing optical reflection and refraction at an interface of media in a virtual space.

Graphic rendering using three dimensional virtual space is in general use in recent TV games.

However, it is difficult for image processing apparatuses used in the usual game machines to express an optical effect of the water surface in the virtual space during high speed rendering processing.

Image processing apparatuses including a special purpose hardware, such as, a "pixel shader," are used in high-priced personal computers and game machines, in which a high performance image processing apparatus is incorporated, so the optical effect of the water surface can be expressed. It is difficult for low priced game machines to execute the same processing without the high-priced processors.

In the modeling of the conventional type, for usual image processing apparatuses (without special purpose hardware, such as, a pixel shader), it is necessary to execute image processing of a floating body at the water surface extending though two media, over and under the water, by separating one object into a partial object (model) over and under the water. The separated objects are independently processed.

For example, as shown in FIG. 18, in a case of an object OB extending over and under the water surface in a virtual space SP, a cut (separated) model OB1 (FIG. 18) of a portion over the water surface W shown by hatching, and a out (separated) model OB2 (FIG. 19) of a portion under the water surface W, are generated. The data of the cut models are independently managed and independently rendered by an image processing apparatus.

The cut (separated) model's generation is a big burden for computer graphics designers. The volume of data to be managed increases. The data volume to be processed in the virtual space, in the form of object data, increases when processed by the image processing apparatus. Therefore, there is a problem that the processing is complicated, and it becomes one cause of image processing delay called "process drop out".

In the case that the above rendering method is used, cut (separated) models are prepared for the total patterns of various water levels, and various positions and angles of objects when the object is changed in rendering. The water level, and the position and angle of the object, cannot be changed in response to the game situation change.

It is an object of the present invention to solve the above mentioned conventional problems by expressing optical reflection and refraction at a media interface in a virtual space by utilizing processing of rather light load, without the use of any special purpose image processing apparatus.

SUMMARY OF THE INVENTION

An image processing program according to the present invention comprises, an object setting step for setting an object with a predetermined texture on its surface in a virtual space, an interface setting step for setting an interface between different media in said virtual space, a step for visualizing only said texture of said object within one medium (first medium, hereafter) of said media when a portion within said first medium of said object is to be appeared, and a step for visualizing only one of the other textures of said object within one of the other medium (second medium, hereafter) of said media when a portion within said second medium of said object is to be appeared.

Therefore, the optical reflection and refraction is expressed at a media interface in a virtual space by processing of rather light load, without using any special purpose image processing apparatus.

An image processing method according to the present invention comprises, an object setting step for setting an object in a virtual space, an interface setting step for setting an interface between different media in said virtual space, a first camera setting step for setting a first virtual camera for photographing a portion of said object which exists within a medium (first medium), when said first medium is at least one of said media a second camera setting step for setting a second virtual camera substantially symmetric with said first camera within a medium (second medium) bounding with said first medium at a boundary of an interface, said first and second virtual cameras are symmetric with respect to said interface, a third camera setting step for setting a third virtual camera within said first medium on a plane including view direction vectors of said first and second virtual cameras, said third virtual camera having a view direction vector from a coordinate of a rotated coordinate of said view vector of said first virtual camera, said view direction being directed toward a cross point of said first virtual camera with said interface or an adjacent point to said cross point, a first texture photographing step for photographing said object with visualizing a texture of said object within said first medium and with making a texture of said object in said second medium transparent in an image photographed by said first virtual camera, a second texture photographing step for photographing said object with visualizing a texture of said object within said first medium and with making a texture of said object within said second medium transparent in an image photographed by said second virtual camera, and a third texture photographing step for photographing said object with making a texture of said object within said first medium transparent and with visualizing a texture of said object within said second medium in an image photographed by said third virtual camera.

Therefore, the optical reflection and refraction is expressed at a media interface in a virtual space by processing of rather light load, without using any special purpose image processing apparatus.

In the image processing method according to the present invention, said first to third texture photographing steps include, a step for defining a plane perpendicular to said interface, a step for setting a visualized texture and transparent texture by defining a transparent degree of said texture within said one medium as "1", and a transparent degree of said texture within said another texture as "0", a step for projecting said visualized and transparent textures on said object from said perpendicular plane, and a step for combining said predetermined texture of said object and said projected visualized and transparent textures.

Therefore, the image of the object photographed in the first medium by the first virtual camera and the reflected and refracted image at the interface are expressed.

An image processing apparatus according to the present invention comprises, an object setting means for setting an object with a predetermined texture on its surface in a virtual space, an interface setting means for setting an interface between different media in said virtual space, a means for visualizing only said texture of said object within one medium (first medium, hereafter) of said media when a portion within said first medium of said object is to be appeared, and a means for visualizing only one of the other textures of said object within one of the other medium (second medium, hereafter) of said media when a portion within said second medium of said object is to be appeared.

Therefore, the optical reflection and refraction is expressed at a media interface in a virtual space by processing of rather light load, without using any special purpose image processing apparatus.

According to the present invention, the optical reflection and refraction is expressed by processing of rather light load.

Next, an embodiment of the image processing apparatus according to the present invention applied to a game machine is described with reference to the attached drawings.

DETAILED DESCRIPTION OF THE INVENTION

Embodiment 1

Figure 1:
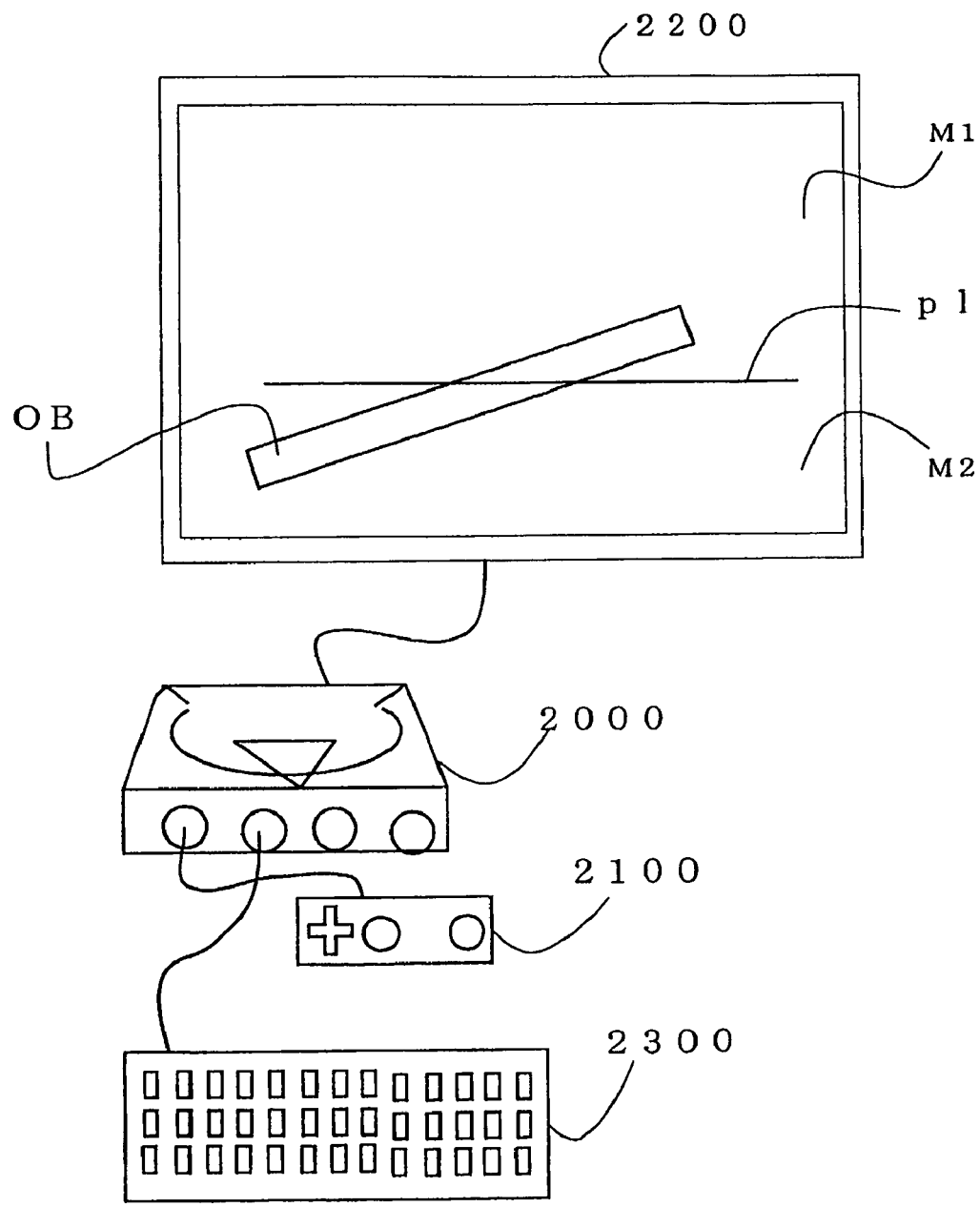
FIG. 1 is an elevational view showing an embodiment of a game machine (image processing apparatus) according to the present invention (Embodiment 1)
Figure 2:
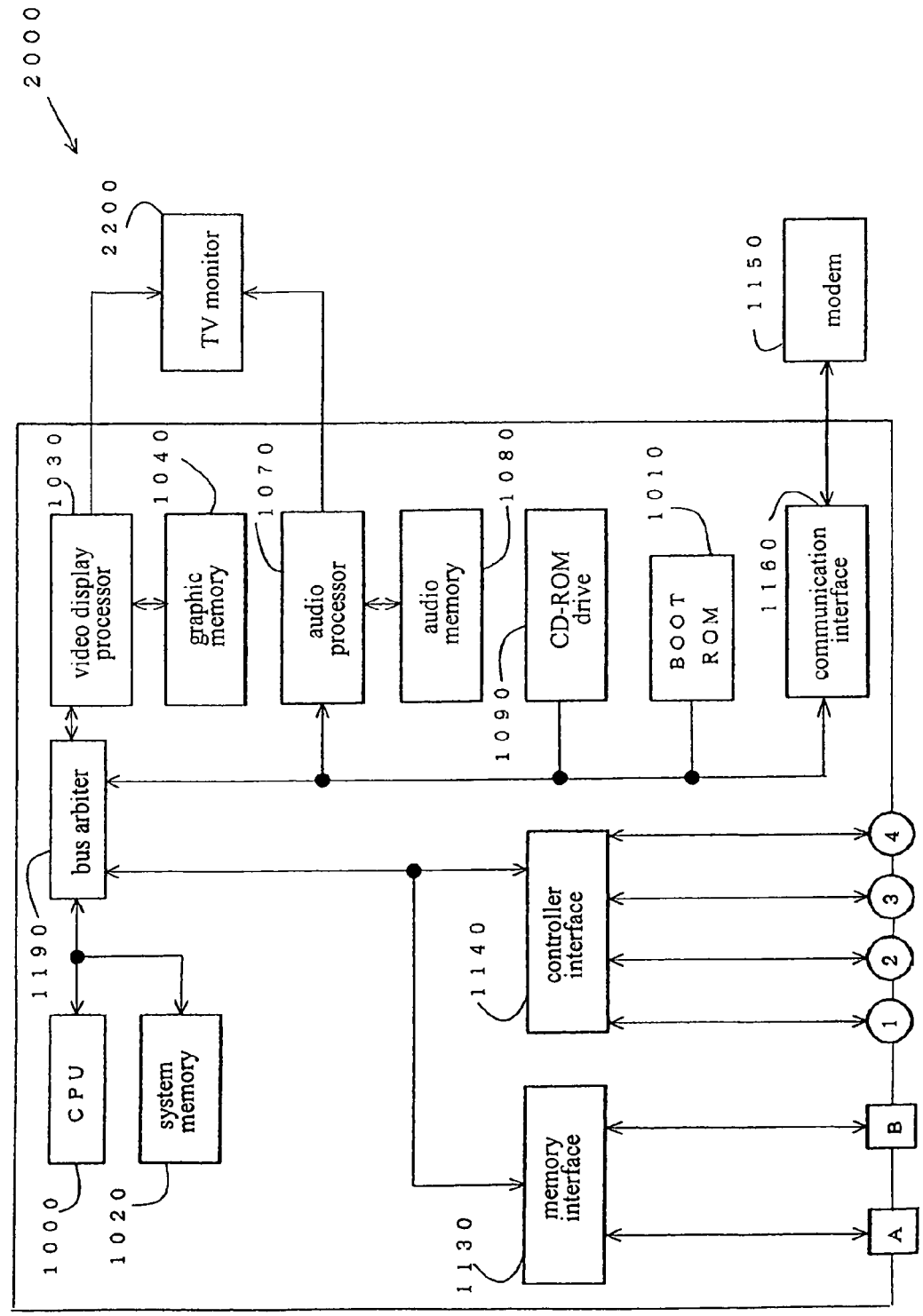
FIG. 2 is a block diagram showing the game machine in FIG. 1 (Embodiment 1)

FIG. 1 is an elevational view showing an embodiment of a game machine (image processing apparatus) according to the present invention. FIG. 2 is a block diagram showing the game machine in FIG. 1.

In FIG. 1, a game machine (image processing apparatus) 2000 is connected with a controller 2100, a display device such as a TV monitor 2200 and a key-board 2300.

On the display device 2200, an object OB controlled by the controller 2100 is shown. The object OB floats on water (second medium) M2 contacting air (first medium) M1 and contacts the media M1 and M2.

However, in a practical game, many other objects exist in the virtual space coordinates, and which are controlled by input signals from the controller, here, only the object OB is described.

In FIG. 2, the game machine (image processing apparatus) 2000 includes a CPU for controlling totally the game machine, a boot ROM in which a program for starting up the game machine 2000 is stored and a system memory 1020 in which a program executed by the CPU 301 and data are stored.

The game machine 2000 is provided with a video processor 1030 for generating and controlling images to be displayed, and a graphic memory 1040 for storing images to be generated and sources of the images. The video processor 1030 displays the generated images on the display device 2200.

The game machine 2000 is provided with an audio processor 1070 for generating sound, and an audio memory 1080 for storing sound data to be generated. The audio processor 1070 generates a digital signal of a sound according to the stored data in the audio memory 1080, and outputs the sound from a speaker and head phone (not shown).

The game machine 2000 is provided with a CD-ROM drive 1090 as a memory device for game programs and data. The program and data stored in the memory medium set in the memory device are read into the system memory 1020, graphic memory 1040 and audio memory 1080.

The game machine 2000 is provided with a memory interface 1030 by which a player can read from, and write into, memory cards A and B. Therefore, a game result of each user and situation of games interrupted midway can be registered.

The game machine 2000 is provided with a MODEM 1150 connected through a communication interface 1160. A network game can be executed by a plurality of game machines 2000 through the network. A statistics of game result, a ranking of players, various events and various information concerning the game can be obtained by a server (not shown).

The game machine 2000 is provided with a controller interface 1140 having terminals 1 to 4 to which the controller 2100 is connected.

Next, an algorithm of an image processing executed in the game machine is described.

Figure 3:
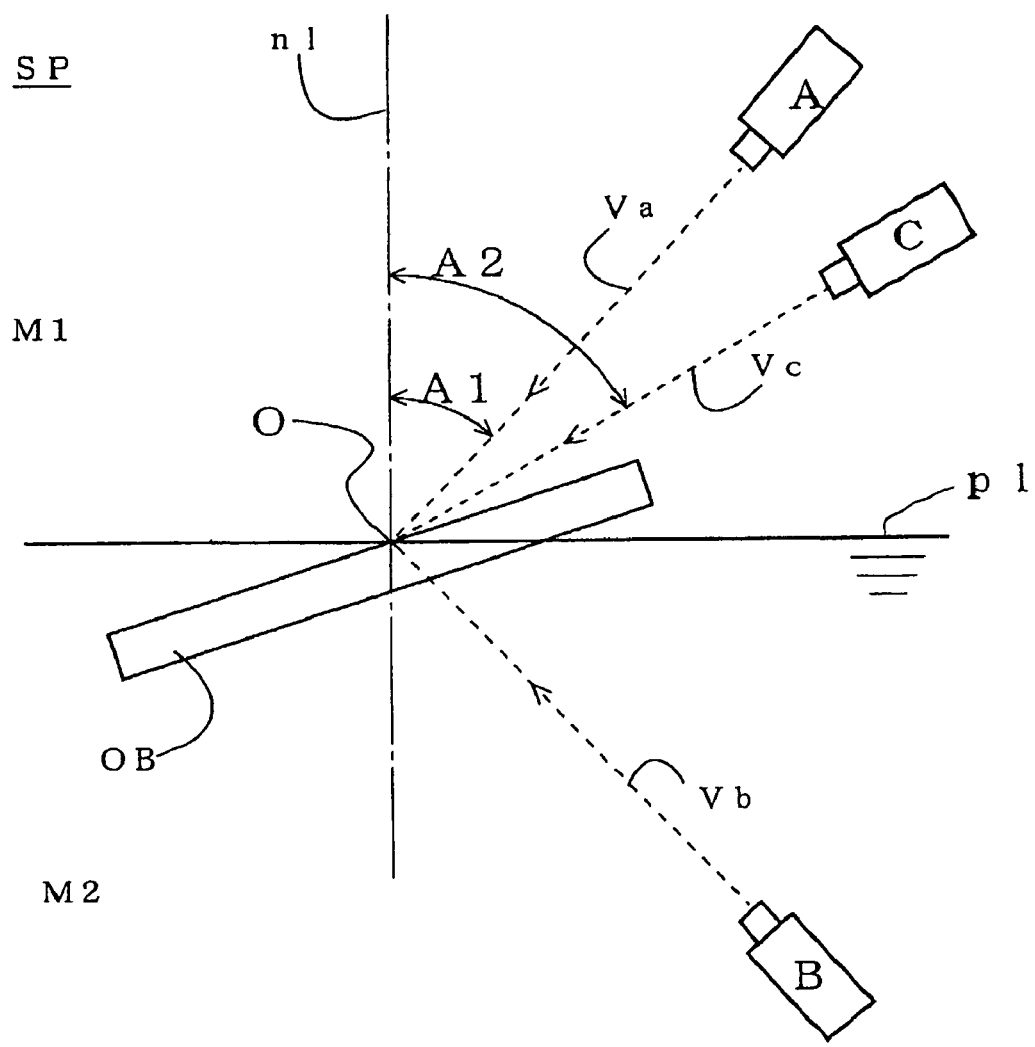
FIG. 3 is an elevational view showing virtual cameras for expressing optical refraction and reflection effect caused by the game machine in FIG. 1 (Embodiment 1)
Figure 4:
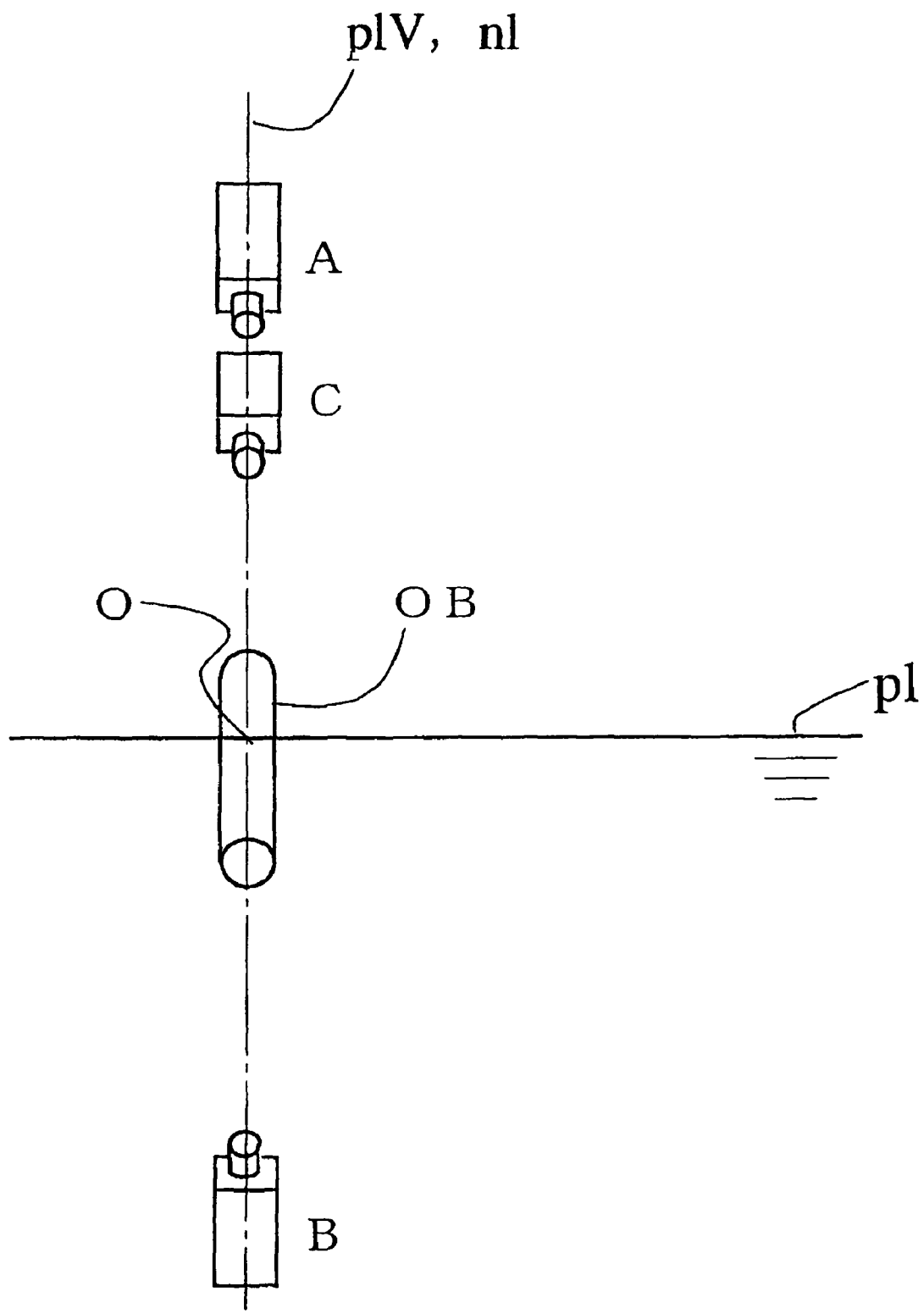
FIG. 4 is a left side view of FIG. 3 (Embodiment 1)
Figure 5:
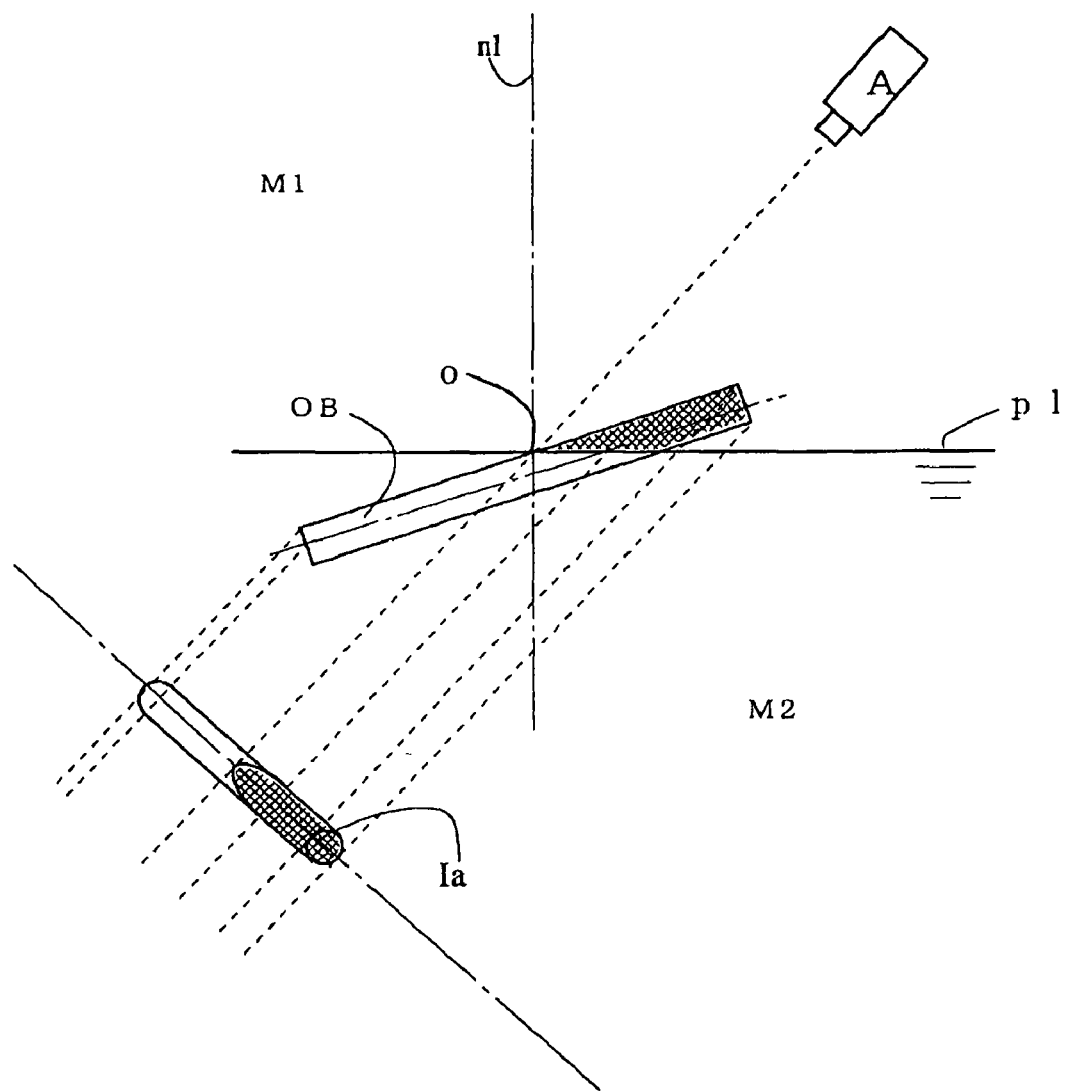
FIG. 5 is a figure showing an image of the first virtual camera in FIG. 3 (Embodiment 1)
Figure 6:
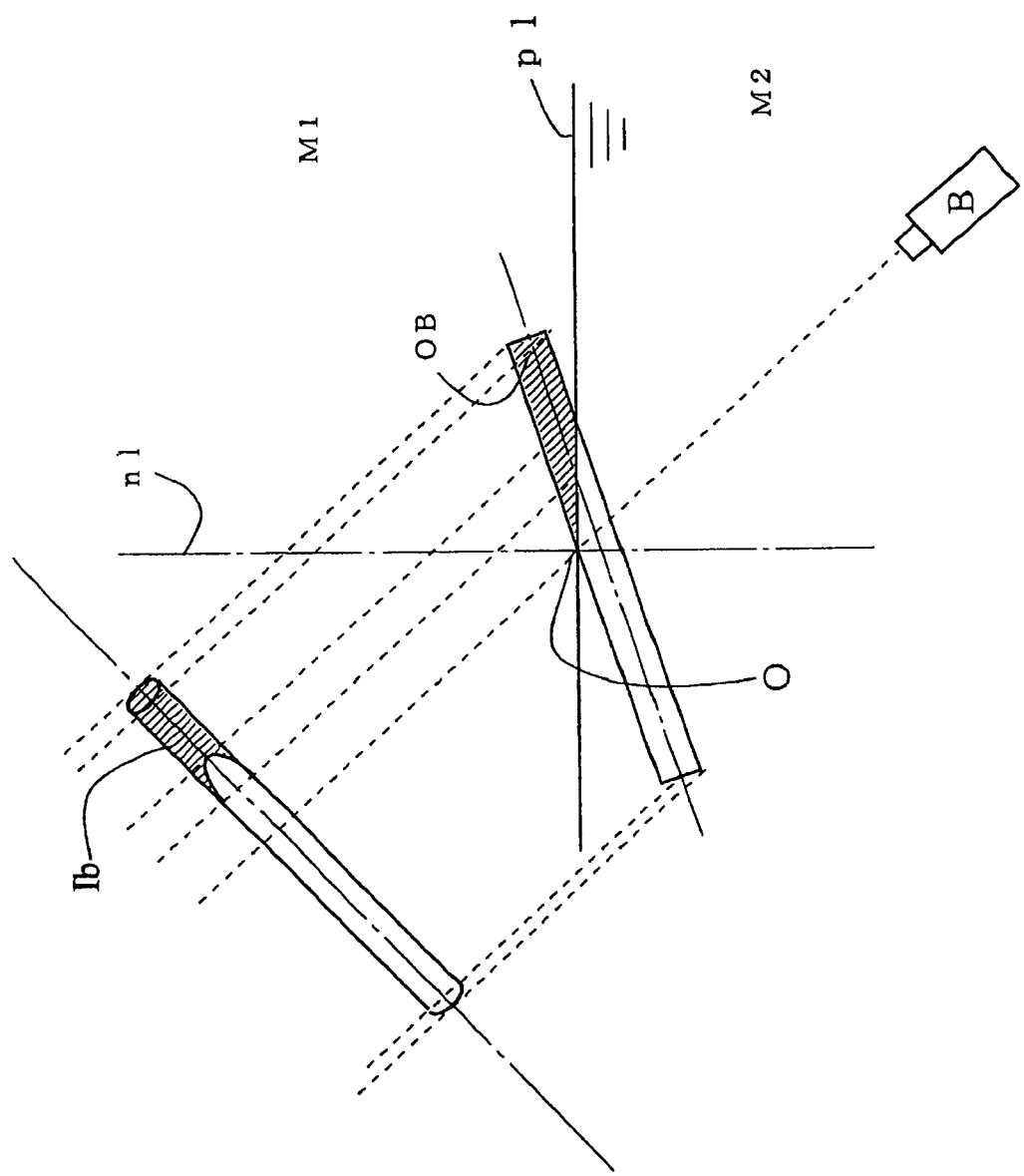
FIG. 6 is a figure showing an image of the second virtual camera in FIG. 3 (Embodiment 1)
Figure 7:
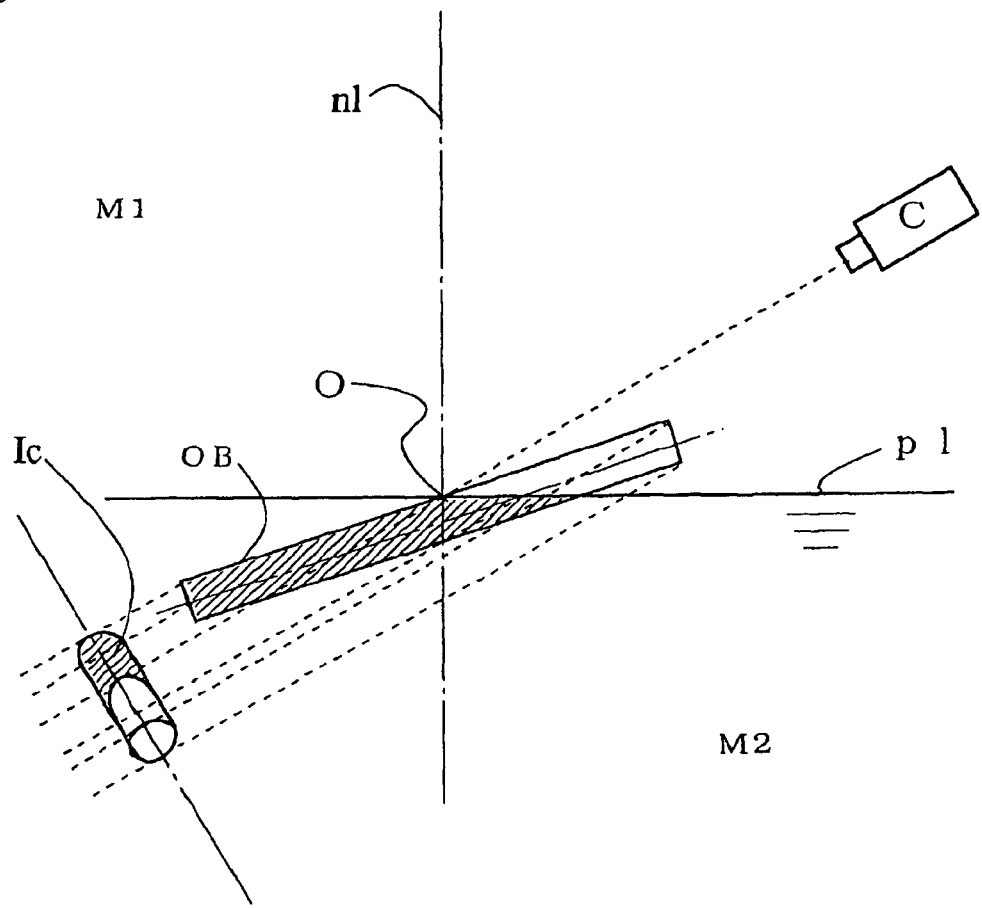
FIG. 7 is a figure showing an image of the third virtual camera in FIG. 3 (Embodiment 1)
Figure 8:
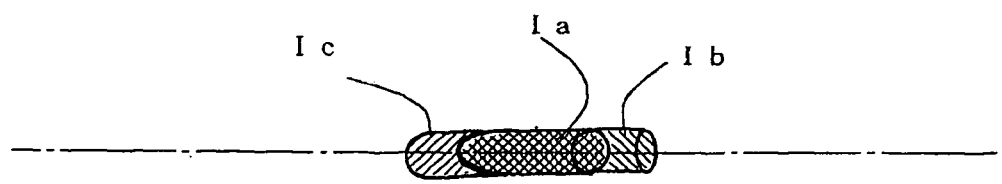
FIG. 8 is a figure showing an image obtained by composing the images of FIGS. 5 to 7 (Embodiment 1)

FIG. 3 is an elevational view showing virtual cameras for expressing optical refraction and reflection effects caused by the game machine in FIG. 1. FIG. 4 is a left side view of FIG. 3. FIG. 5 is a figure showing an image of the first virtual camera in FIG. 3. FIG. 6 is a figure showing an image of the second virtual camera in FIG. 3. FIG. 7 is a figure showing an image of the third virtual camera in FIG. 3. FIG. 8 is a figure showing an image obtained by composing the images of FIGS. 5 to 7.

In FIGS. 3 and 4, the game machine 2000 generates a virtual space SP by means of the CPU 1000, system memory 1020, video graphic processor 1030 and graphic memory 1040, as well as, defines and generates the media M1 and M2 and interface p1 between them and the object OB in the virtual space.

Then, a positional coordinate and a view direction vector of a main virtual camera are set for displaying the object OB corresponding to a game process. The following virtual cameras A, B and C are set in positional coordinate and view direction vector for displaying the object OB by the main camera.

The virtual camera A: The object OB within the medium M1 and the interface p1 are included in its view field. Virtual camera A is for photographing an image Ia observed and other objects within the medium M1. (FIGS. 3, 4 and 5)

The virtual camera B: A virtual camera having a symmetric coordinate and view direction vector to those of the virtual camera A with respect to the interface p1. Virtual camera B is for photographing a reflected image Ib of the object OB within the medium M1 (air) reflected on the interface p1. (FIGS. 3, 4 and 5)

The virtual camera C: It is positioned on a plane p1V including the view direction vectors of the virtual cameras A and B and has a view direction vector passing through a cross point O of the virtual camera s optical axis with the interface. (FIGS. 3, 4 and 7).

The following parameters are defined concerning the virtual cameras A, B and C.

Va, Vb, Vc: View direction vectors of the virtual cameras A, B and C p1V: a plane including the view direction vectors Va and Vb of the virtual cameras A and B, and a normal n1.

O: The cross point of the view direction vectors Va, Vb and Vc of the virtual cameras A, B and C with the interface p1.

A1: Degree of an acute angle made by the view direction vector Va of the virtual camera A with the normal n1 within the medium M1.

A2: Degree of an acute angle made by the view direction vector Vb of the virtual camera B with the normal n1 within the medium M1.

n1: Refractive index of the medium M1
n2: Refractive index of the medium M2

A relationship between the angles A1 and A2 is set by the formula (1) with the refraction indexes n1 and n2.

$$n1/n2 = \sin A2/\sin A2 \quad \text{formula (1)}$$

As shown in FIGS. 3, 5 and 7, by setting the angular relationship of formula (1), the refracted image Ic is photographed for accurate refraction expression, when the object OB within the medium M2 is observed from inside of the medium M1.

However, the accurate image in optical meaning is not necessarily requested. When an exaggerated image, etc., may rather be requested, another angular relationship than the formula (1) is applied.

As shown in FIGS. 3, 5 and 6, the reflected image Ib is reflected on the interface p1 on the side of the medium M1 when the object OS in the medium M1 is observed by the virtual camera B from inside of the medium M2.

As shown in FIG. 5, a plane vm1 is defined as a perpendicular plane to the interface p1, so that the portion of the image photographed by the virtual camera A within the medium M2 is not displayed. Projection texture data with a transparent degree (α value) of texture within the medium M1 of "1" (100% opaque) and a transparent degree (α value) of texture within the medium M2 of "0" (100% transparent), is projected. The texture mapped on the portion within the medium M2 is "0" in the transparent degree (α value) and the portion is transparent and not displayed when the object is to be displayed. The surface Ia of other portions are 1 in the transparent degree (α value) and are normally displayed since they are 100% opaque. In the figure, the displayed portion Ia is shown by cross hatching.

As shown in FIG. 6, a plane vm1 is defined as a perpendicular plane to the interface p1 so that the portion of the image photographed by the virtual camera B within the medium M2 is not displayed. The projection texture data with a transparent degree (α value) of texture within the medium M1 of 1 and a transparent degree (α value) of texture within the medium M2 of 0 is projected. The texture mapped on the portion within the medium M2 is 0 in the transparent degree (α value). And other portions Ib are 1 in the transparent degree (α value) and are displayed. In the figure, the displayed portion Ia is shown by hatching rising in the leftward direction.

As shown in FIG. 7, a plane vm1 is defined as a perpendicular plane to the interface p1 so that the portion of the image photographed by the virtual camera C within the medium M1 is not displayed. On the contrary to the virtual camera A, the projection texture data is projected, in which the transparent degree (α value) of texture within the medium M1 is 0 and a transparent degree (α value) of texture within the medium M2 of 1. The texture mapped on the portion within the medium M1 is 0 n the transparent degree (α value) and not displayed. The surface Ic of other portions are 1 in the transparent degree (α value) and are normally displayed since they are 100% opaque. In the figure, the displayed portion is shown by hatching rising in rightward direction.

In FIG. 8, the composed image of the images Ia, Ib and Ic shows simultaneously the object OB itself and the reflection image Ib and the refraction image Ic when the object OB is observed from the position of the virtual camera A as the main camera. Therefore, a realistic image expression is possible with reflection and refraction effect.

The texture mapping is a processing on two dimensional images, so the load of the calculation processing is much less than the generation of the conventional separated models.

Namely, it is possible by the embodiment above to express optical reflection and refraction effect by the processing of rather light load.

In the embodiment above, the CPU 1000, system memory 1020, video graphic processor 1030 and graphic memory 1040 cooperatively function as an object generating means for generating the object OB in the virtual space SP and as a media generating means for generating the media M1 and M2 contacting the interface p1.

The CPU 1000 and system memory 1020 cooperatively function as a first, second and third camera generating means for generating the virtual cameras A, B and C.

The CPU 1000, system memory 1020, video graphic processor 1030 and graphic memory 1040 cooperatively function as a first texture generating means for visualizing the surface within the medium M1 and for making the surface within the medium M2 transparent as for the image of the object OB photographed by the virtual camera A, as a second texture generating means for visualizing the surface within the medium M1 and for making the surface within the medium M2 transparent as for the image of the object OB photographed by the virtual camera B, and as third texture generating means for making the surface within the medium M1 transparent and for visualizing the surface within the medium M2 as for the image of the object OB photographed by the virtual camera C.

In the embodiment above, two kinds of media M1 and M2 are described. However, similar processing is possible for a virtual space having more number of media at each interface where two media are adjacent to each other.

Figure 9A:
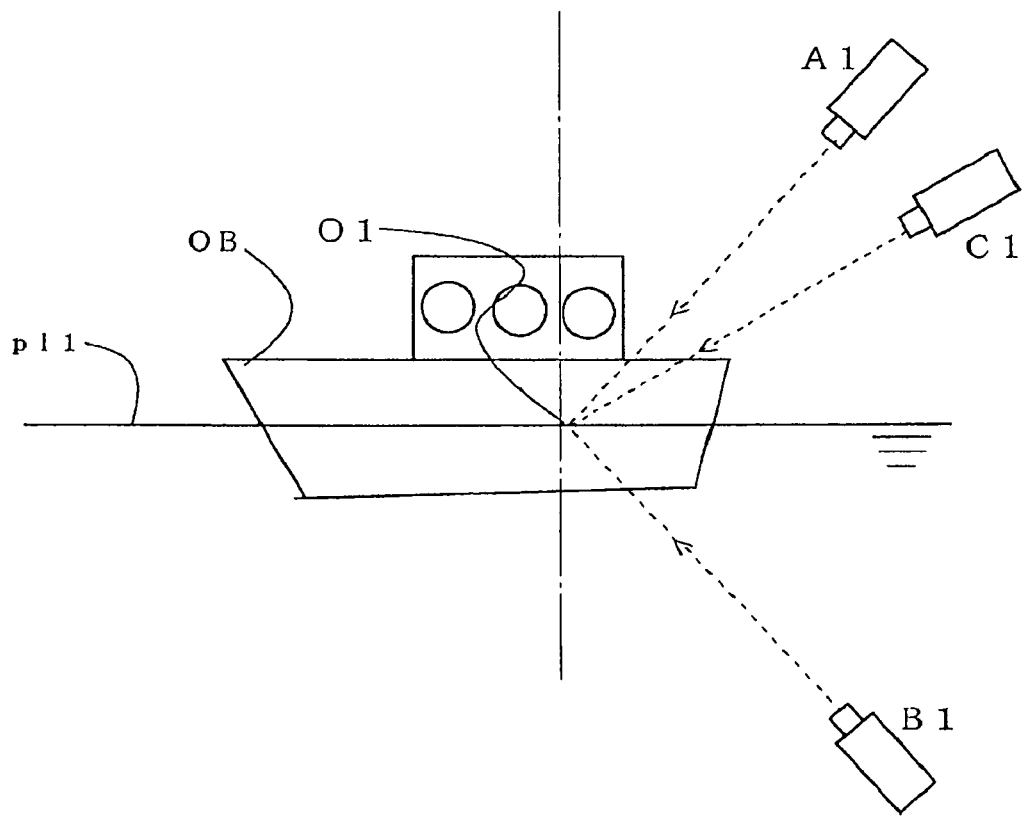
FIG. 9A is an elevational view showing a processing by the game machine in FIG. 1 of an interface level which changes (Embodiment 1)
Figure 9B:
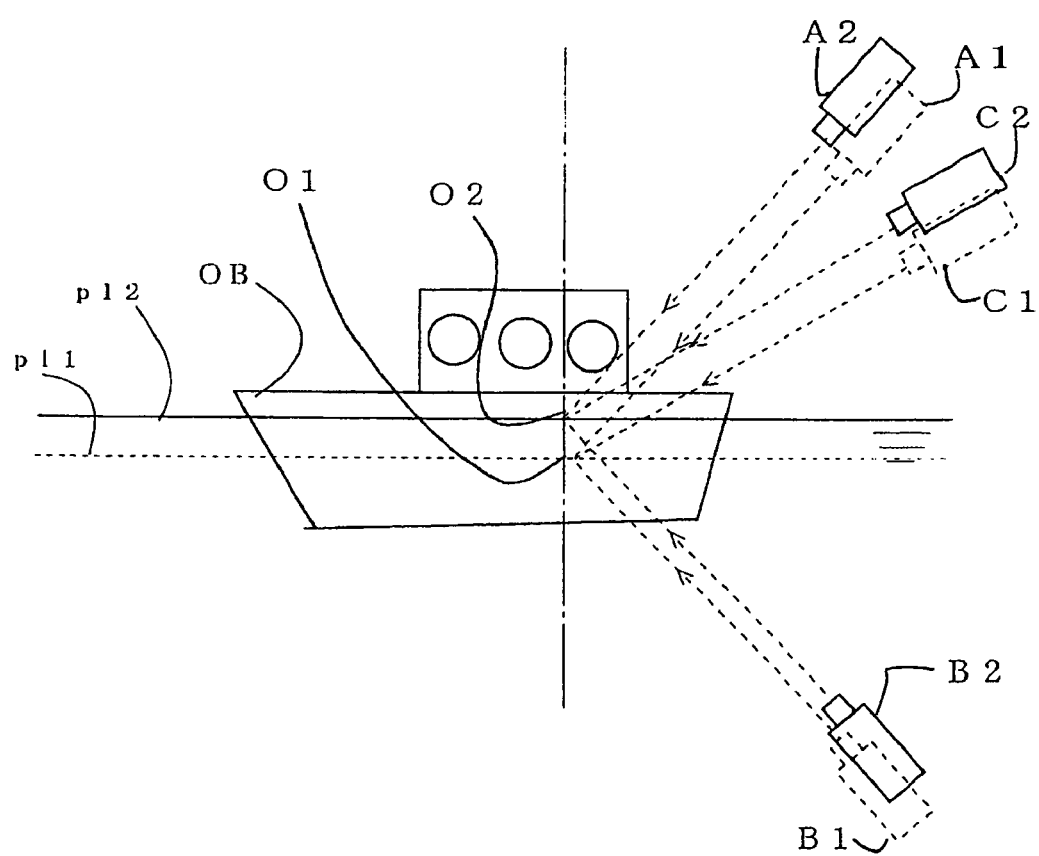
FIG. 9B is an elevational view showing a processing for another level in the processing of FIG. 9A (Embodiment 1)
Figure 9C:
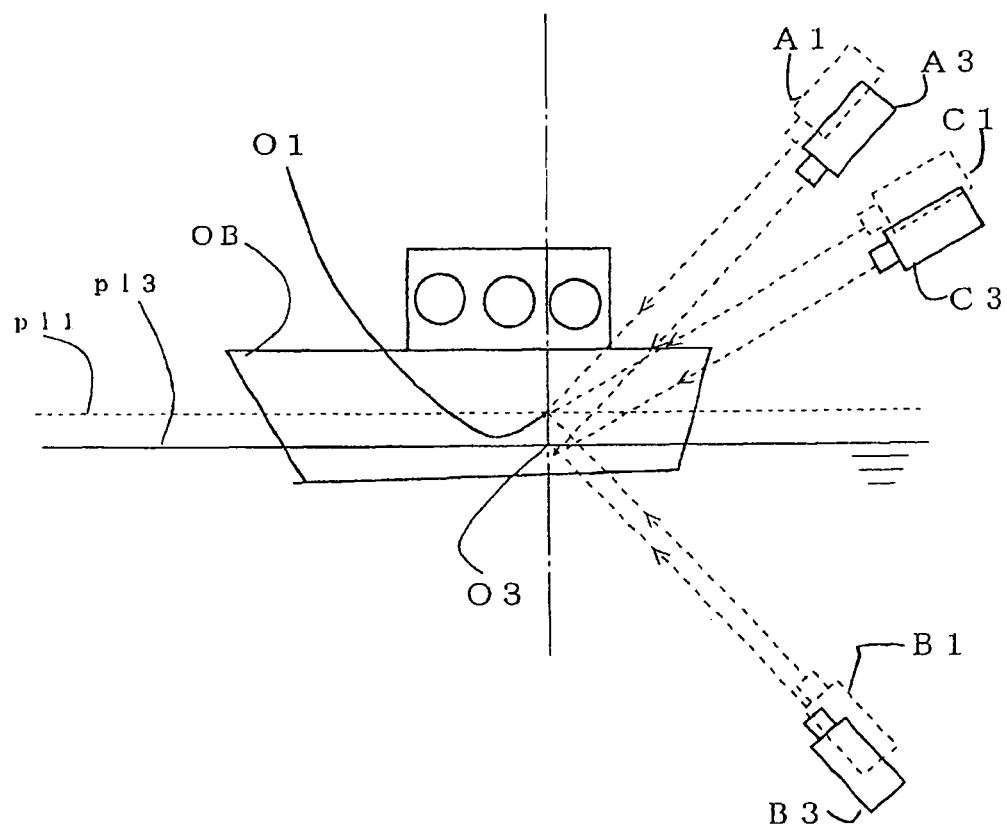
FIG. 9C is an elevational view showing a processing for yet another level in the processing of FIG. 9A (Embodiment 1)

Various interfaces other than a flat plane may be processed. For example, as for the interface p1 of the water surface changing to three levels as shown in FIG. 9, a plurality of horizontal interfaces p11, p12 and p13 are generated. Different virtual cameras B and virtual cameras C are set for the interfaces p11, p12 and p13. Then, images corresponding to the images Ib and Ic of FIG. 8 are rendered for three interfaces, so the optical reflection and refraction effect can be approximately expressed without preparing the cut models cut at the waterlines, of the water surface and an object at the levels.

Figure 10:
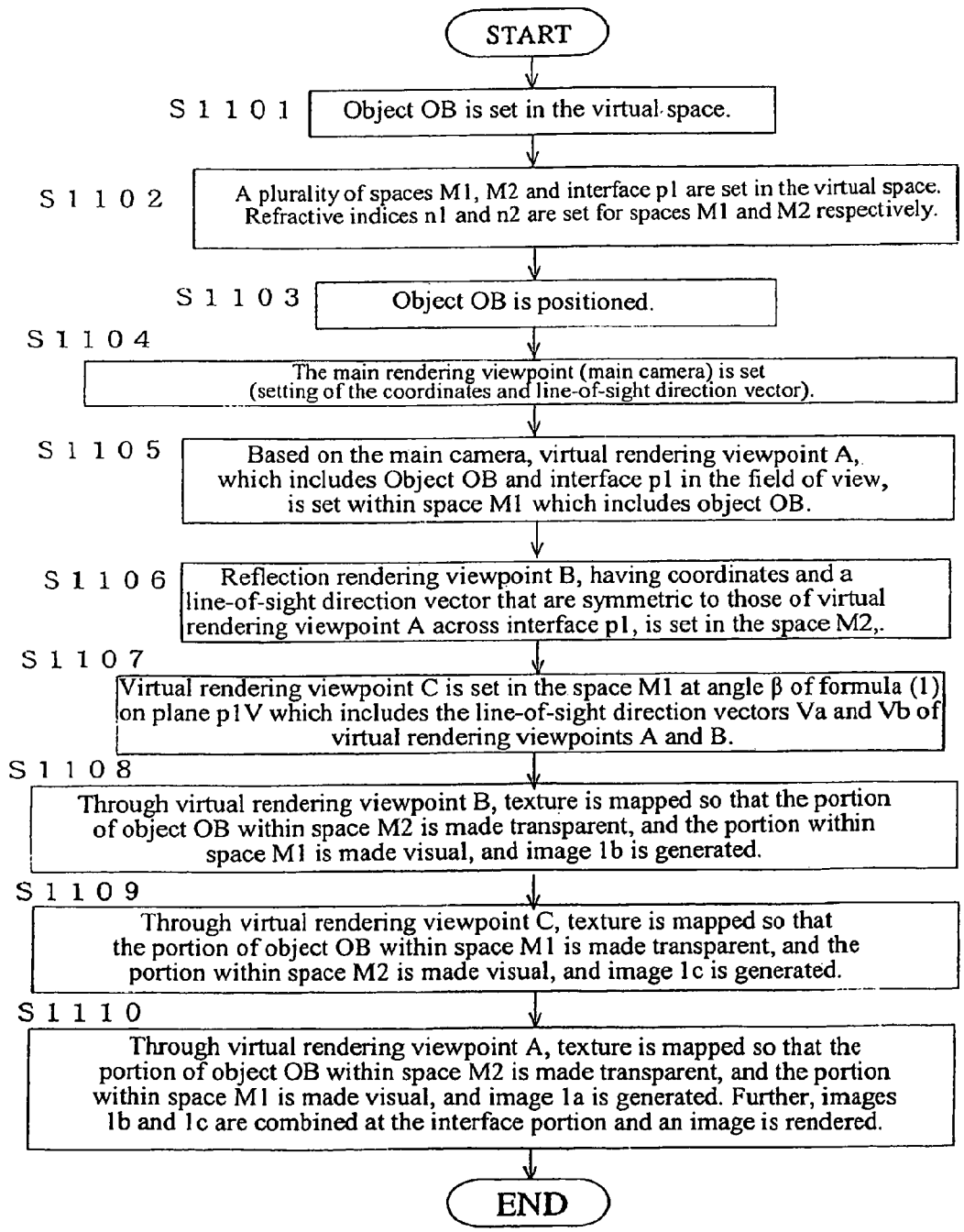
FIG. 10 is a flowchart showing a processing of an image processing program executed by the game machine of FIG. 1 (Embodiment 1)

In order to express the object OB by the above algorithm, the game machine 2000 executes the image processing program including the following steps in FIG. 10.

Step S1101: First, the object OB is set in the virtual space SP. Then, the processing is advanced to the step S1102.

Step 1102: The media M1 and M2 and the interface p1 are set in the virtual space SP and the refraction indexes n1 and n2 are set. Then, the processing is advanced to the step S1103.

Step S1104: The object OB is positioned in response to the process of the game. Then, the processing is advanced to the step S1104.

Step S1104: The main camera is set and the processing is advanced to the step S1105. In this case, the camera setting means that the coordinate indicating the position in the virtual three dimensional space and the view direction vector of the virtual camera are set.

Step S1105: The virtual camera A is set in the medium M1 in which the object is at least partially involved. In the view field of the virtual camera A, the object OB and the interface p1 are included. Then, the processing is advanced to the step S1106.

Step S1106: The virtual camera B is set in the medium M2, coordinate and view direction vector of which are symmetric to those of the virtual camera B with respect to the interface p1. Then, the processing is advanced to the step S1107.

Step S1107: The virtual camera C is set in the medium M1 so that the anglar relationship is fulfilled. Then, the processing is advanced to the step S1108.

S1108: The image of the object OB by the virtual camera B is generated. The texture is mapped on the image so that the surface of the portion within the medium M2 is made transparent, and the surface of the portion within the medium M1 is visualized. The image Ib is generated. Then, the processing is advanced to the step S1110.

S1109: The image of the object OB by the virtual camera C is generated. The texture is mapped on the image so that the surface of the portion within the medium M1 is made transparent and the surface of the portion within the medium M2 is visualized. The image Ic is generated. Then, the processing is advanced to the step S1111.

S1110: The image of the object OB by the virtual camera A is generated. The texture is mapped on the image so that the surface of the portion within the medium M2 is made transparent and the surface of the portion within the medium M1 is visualized. The image Ia is generated and the Images Ia, Ib and Ic are composed. Then, the display processing is executed.

By image processing above, the optical reflection and refraction are expressed by rather light load without preparing cut models cut at the predetermined interfaces (water surfaces).

When the above image processing is executed by a general purpose computer, program code is read, from a memory medium or a communication medium into a system memory of the general purpose computer, for letting the general purpose computer execute the image processing program above.

Embodiment 2

The image processing method according to the present invention is not limited to the embodiment 1 but the setting of the transparent degree of the surface my be omitted with respect to some cameras as the main camera.

Figure 11:
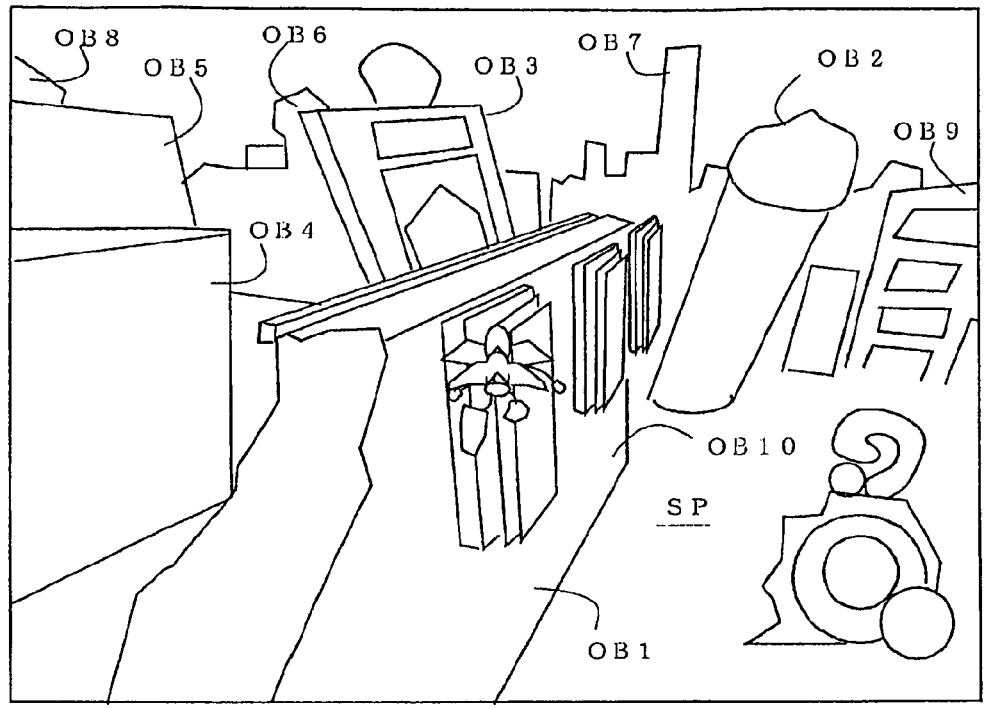
FIG. 11 is a figure showing an image of the first virtual camera which does not set the degree of transparency and does not render the water surface in another virtual space (Embodiment 2)
Figure 12:
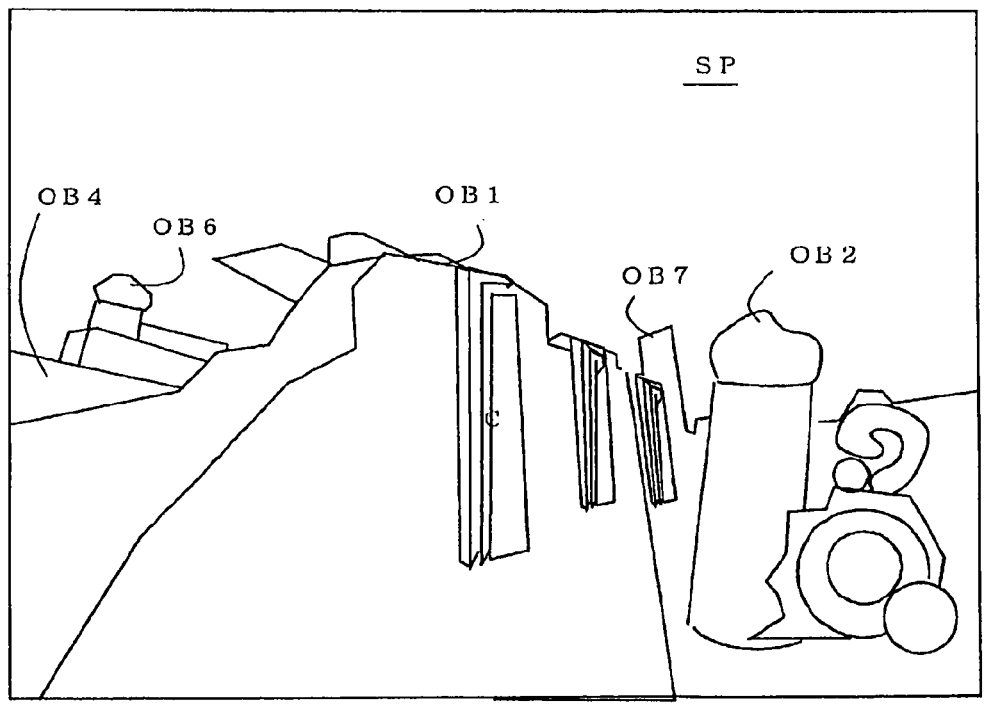
FIG. 12 is a figure showing an image of the second virtual camera before the setting of the degree of the transparency in the virtual space of FIG. 11 (Embodiment 2)
Figure 13:
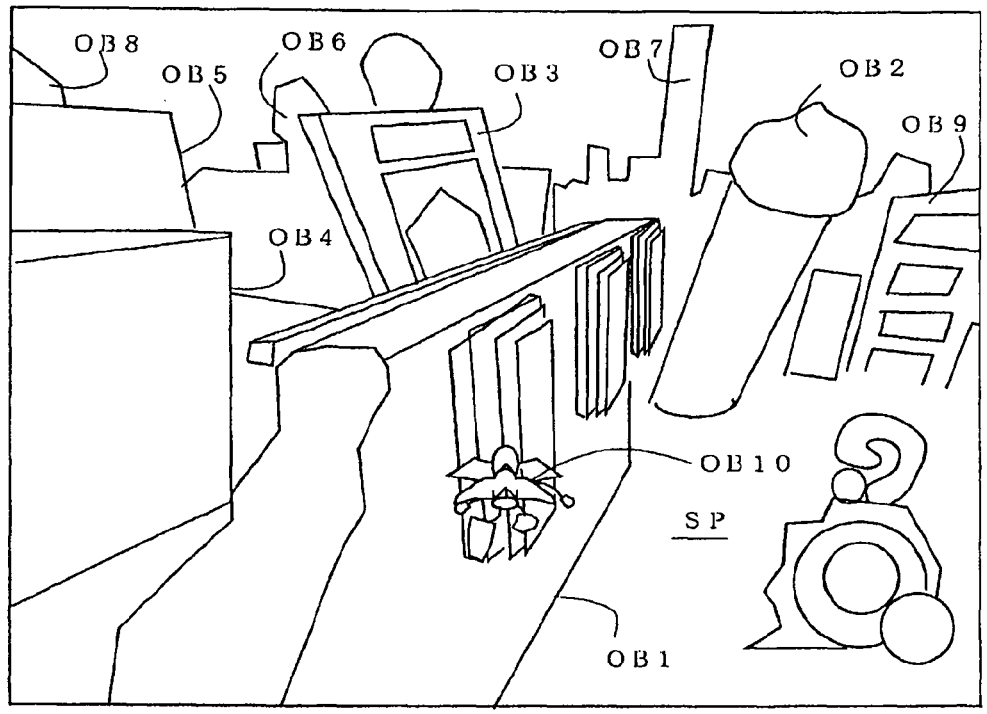
FIG. 13 is a figure showing an image of the third virtual camera before the setting of the degree of the transparency in the virtual space of FIG. 11 (Embodiment 2)
Figure 14:
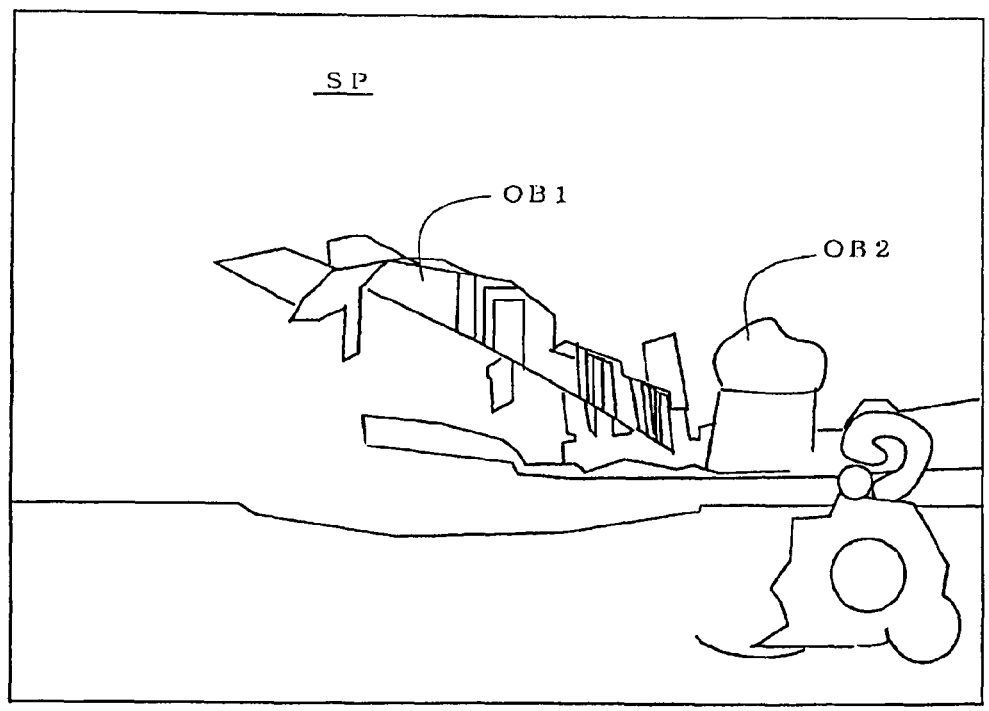
FIG. 14 is a figure showing an image of the second virtual camera after the setting of the degree of the transparency in the virtual space of FIG. 11 (Embodiment 2)
Figure 15:
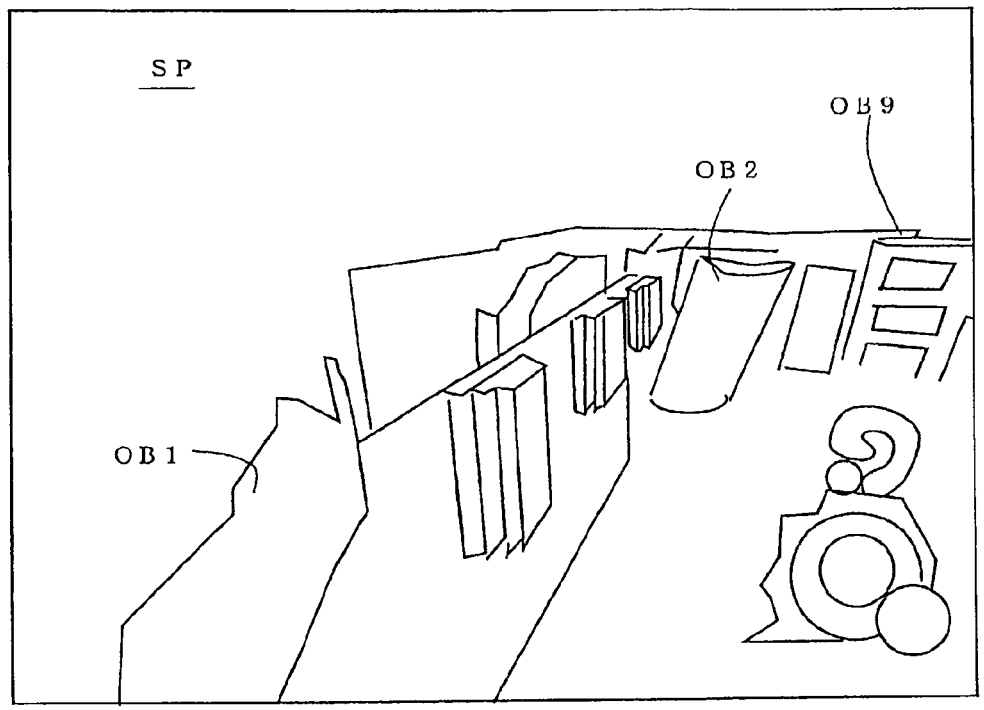
FIG. 15 is a figure showing an image of the third virtual camera after the setting of the degree of the transparency in the virtual space of FIG. 11 (Embodiment 2)
Figure 16:
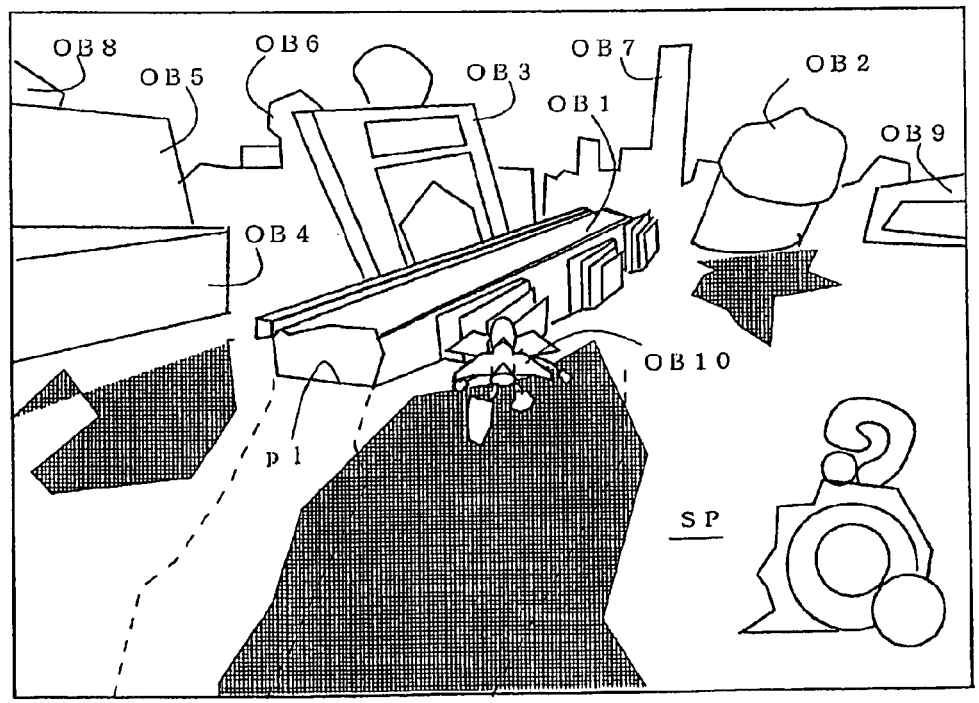
FIG. 16 is a figure showing an image obtained by composing the images of FIGS. 11, 14 and 15 (Embodiment 2)
Figure 17:
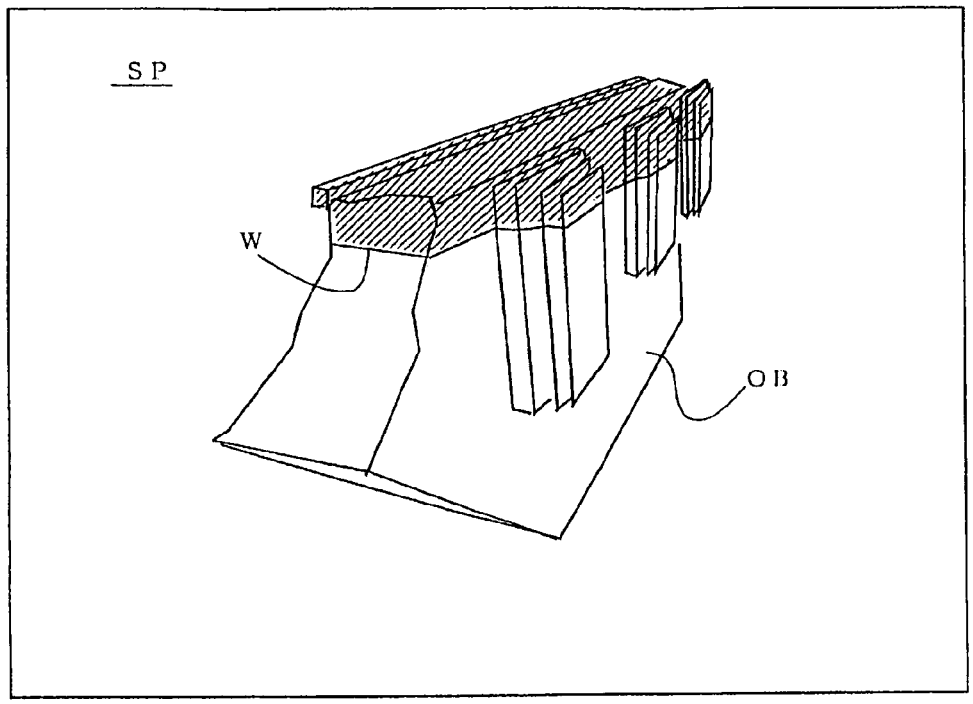
FIG. 17 is a figure showing a model used in the conventional processing (Prior Art)
Figure 18:
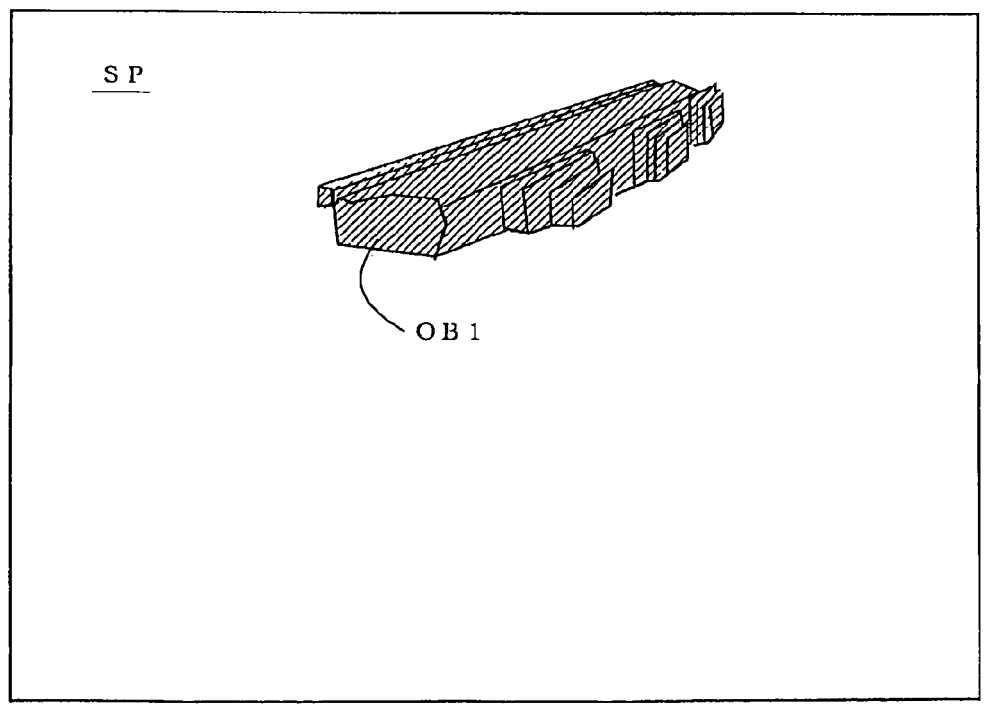
FIG. 18 is a figure showing the model of FIG. 17 an upper portion higher than the water surface which is separated (Prior Art)
Figure 19:
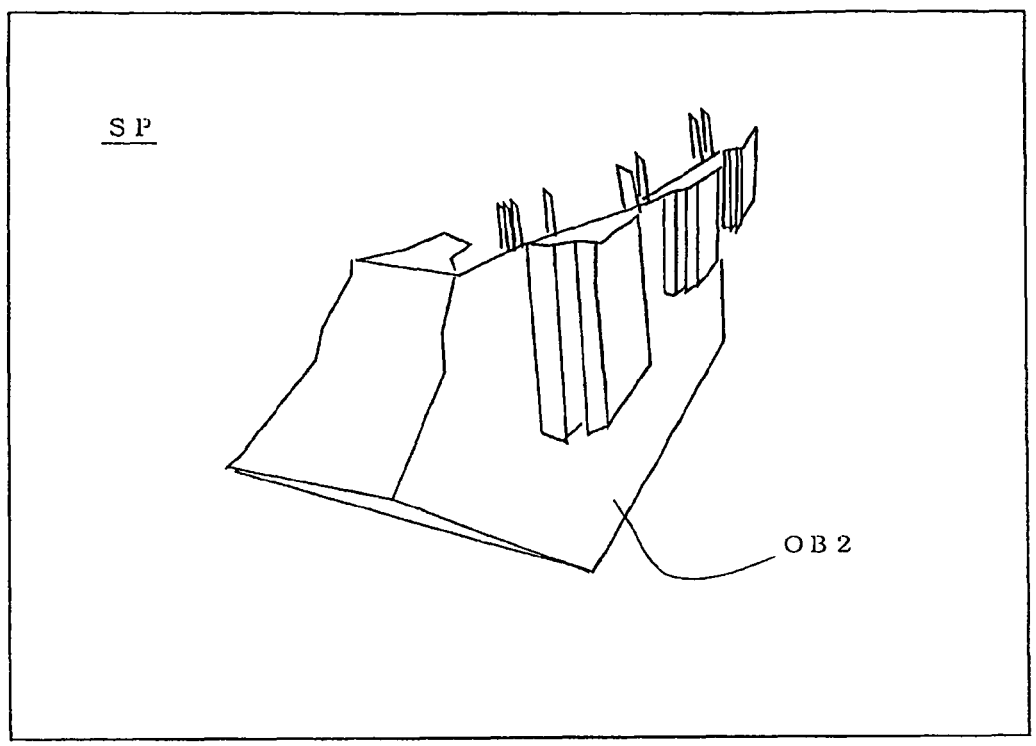
FIG. 19 is a figure showing the model of FIG. 17 a lower portion below the water surface which is separated (Prior Art).

FIG. 11 is a figure showing an image of the first virtual camera which does not set the degree of transparency and does not render the water surface in another virtual space. FIG. 12 is a figure showing an image of the second virtual camera before the setting of the degree of the transparency in the virtual space of FIG. 11. FIG. 13 is a figure showing an image of the third virtual camera before the setting of the degree of the transparency in the virtual space of FIG. 11. FIG. 14 is a figure showing an image of the second virtual camera after the setting of the degree of the transparency in the virtual space of FIG. 11. FIG. 15 is a figure showing an image of the third virtual camera after the setting of the degree of the transparency in the virtual space of FIG. 11. FIG. 16 is a figure showing an image obtained by composing the images of FIGS. 11, 14 and 15.

As shown in FIG. 11, there are a plurality of background objects OB1 to OB9 and a character object OB10 in the virtual space SP. The objects OB1 to OB9 exist over and under the water surface p1 (FIG. 16).

FIGS. 11, 12 and 13 show images in which the objects OB1 to OB9 are photographed by the virtual cameras A, B and C and the existence of the water is neglected, similarly to the embodiment 1.

As shown in FIG. 11, the virtual camera B photographs the texture with the transparent degree $\alpha=0$ of the surface under the water and $\alpha=1$ to be visualized over the water, similarly to the embodiment 1.

As shown in FIG. 15, the virtual camera C photographs the texture with the transparent degree $\alpha=0$ of the surface over the water and $\alpha=1$ to be visualized under the water, similarly to the embodiment 1.

While, as for the virtual camera A, the setting of the transparent degree is omitted and the water surface p1 is photographed. Then, the scene under the water is concealed. Then, the calculation is decreased for setting the transparent degree.

FIG. 16 shows a composed image of the images in FIGS. 11, 14 and 15 and the water surface p1.

The image processing program of the embodiment 2 is realized by modifying the step S1110 to be the following steps S1101-2.

Step S1101-2: The images Ia of the objects OB (OB1 to OB9) by the virtual camera A and of the water surface p1 are generated. And the images Ia, Ib and Ic and the water surface p1 are composed.

The embodiment 2 has an advantage of lightened calculation load for the texture mapping with respect to the concealed portion by rendering the water surface in addition to the advantage of the embodiment 1.

The embodiment above is described concerning the image processing for games. However, the present invention may be applied to any image processing for displaying objects in a virtual space including a plurality of media, for example, in a simulator, presentation tool etc.

The invention claimed is:

1. A method of processing an image, comprising, setting an object in a virtual space;

setting an interface that divides said virtual space into spaces according to an interface setting operation;

setting, at least in a first space of said spaces, a first virtual rendering viewpoint so as to have the object partially presented in said first space according to a first rendering viewpoint setting operation;

setting, in a second space of said spaces which is adjacent to said first space via said interface, a second virtual rendering viewpoint symmetrical to said first virtual rendering viewpoint along said interface according to a second rendering viewpoint setting operation;

setting, in said first space, a third virtual rendering viewpoint arranged on a plane that includes line-of-sight direction vectors of said first and second virtual rendering viewpoints, passing through or near the intersection of said first virtual rendering viewpoint and said interface, and having a line-of-sight direction vector in which the line-of-direction vector of said first virtual rendering viewpoint is rotated in an interface direction for a prescribed angle, according to a third rendering viewpoint setting operation;

rendering, with respect to the first virtual rendering viewpoint, said object with a texture in the first space, and rendering said object without rendering a texture in the second space, according to a first texture rendering operation;

rendering, with respect to the second virtual rendering viewpoint, said object with a texture in the first space, and rendering said object without rendering a texture in the second space, according to a second texture rendering operation; and rendering, with respect to the third virtual imaging viewpoint, said object with a texture in the second space, and rendering said object without rendering a texture in the first space, according to a third texture rendering operation.

2. A method according to claim 1, wherein said first to third texture rendering operations each comprises:

setting a plane perpendicular to said interface;

setting visual/transparent textures, wherein a texture transparency in the first and second spaces on one side of said interface is set at 1 and the texture transparency in the first and second spaces on an other side of said interface is set at 0;

projecting said visual/transparent textures on said object from said perpendicular plane; and combining a preset texture of said object and said projected visual/transparent textures.

3. A computer readable memory medium having recorded therein program codes executable by a computer processor for executing the operations comprising:

setting an object in a virtual space;

setting an interface that divides said virtual space into spaces according to an interface setting operation;

setting, at least in a first space of said spaces, a first virtual rendering viewpoint so as to have the object partially presented in said first space according to a first rendering viewpoint setting operation;

setting, in a second space of said spaces which is adjacent to said first space via said interface, a second virtual rendering viewpoint symmetrical to said first virtual rendering viewpoint along said interface according to a second rendering viewpoint setting operation;

setting, in said first space, a third virtual rendering viewpoint arranged on a plane that includes line-of-sight direction vectors of said first and second virtual rendering viewpoints, passing through or near the intersection of said first virtual rendering viewpoint and said interface, and having a line-of-sight direction vector in which the line-of-direction vector of said first virtual rendering viewpoint is rotated in an interface direction for a prescribed angle, according to a third rendering viewpoint setting operation;

rendering, with respect to the first virtual rendering viewpoint, said object with a texture in the first space, and rendering said object without rendering a texture in the second space, according to a first texture rendering operation;

rendering, with respect to the second virtual rendering viewpoint, said object with a texture in the first space, and rendering said object without rendering a texture in the second space, according to a second texture rendering operation; and rendering, with respect to the third virtual imaging viewpoint, said object with a texture in the second space, and rendering said object without rendering a texture in the first space, according to a third texture rendering operation.

4. A computer readable memory medium according to claim 3, wherein said first to third texture rendering operations each comprises:

setting a plane perpendicular to said interface;

setting visual/transparent textures, wherein a texture transparency in the first and second spaces on one side of said interface is set at 1 and the texture transparency in the first and second spaces on an other side of said interface is set at 0;

projecting said visual/transparent textures on said object from said perpendicular plane; and combining a preset texture of said object and said projected visual/transparent textures.

5. An image processing apparatus, comprising, object setting device for setting an object in a virtual space;

an interface setting device for setting an interface that divides said virtual space into spaces;

a first rendering viewpoint setting device for setting, in at least a first space of said spaces, a first virtual rendering viewpoint so as to obtain a presentation of said object according to said first virtual rendering viewpoint, in which said presentation will exist at least partially in said first space;

a second rendering viewpoint setting device for setting, in a second space of said spaces which is adjacent to said first space across said interface, a second virtual rendering viewpoint symmetrical to said first virtual rendering viewpoint with respect to said interface;

a third rendering viewpoint setting device for setting, in said first space, a third virtual rendering viewpoint arranged on a plane that includes line-of-sight direction vectors of said first and second virtual rendering viewpoints, passing through or near the intersection of said first virtual rendering viewpoint and said interface, and having a line-of-sight direction vector in which the line-of-direction vector of said first virtual rendering viewpoint is rotated in an interface direction for a prescribed angle;

a first texture rendering device for rendering, with respect to the first virtual rendering viewpoint, said object with a texture in the first space, and rendering said object without rendering a texture in the second space;

a second texture rendering device for rendering, with respect to the second virtual rendering viewpoint, said object with a texture in the first space, and rendering said object without rendering a texture in the second space; and a third texture rendering device for rendering, with respect to the third virtual imaging viewpoint, said object with a texture in the second space, and rendering said object without rendering a texture in the first space.

6. The image processing apparatus according to claim 5, wherein said first to third texture rendering devices each comprises:

a plane setting device for setting a plane perpendicular to said interface;

a texture setting device for setting visual/transparent textures, wherein a texture transparency in the first and second spaces on one side of said interface is set at 1 and the texture transparency in the first and second spaces on an other side of said interface is set at 0;

a projecting device for projecting said visual/transparent textures on said object from said perpendicular plane; and a combining device for combining a preset texture of said object and said projected visual/transparent textures.

* * * * *